United States Patent
Chen

(10) Patent No.: US 9,916,218 B2
(45) Date of Patent: Mar. 13, 2018

(54) METHOD AND APPARATUS FOR INTERCEPTING IMPLANTED INFORMATION IN APPLICATION

(71) Applicant: BEIJING QIHOO TECHNOLOGY COMPANY LIMITED, Beijing (CN)

(72) Inventor: Jie Chen, Beijing (CN)

(73) Assignee: Beijing Qihoo Technology Company Limited, Beijing (CN)

(*) Notice: Subject to any disclaimer, the term of this patent is extended or adjusted under 35 U.S.C. 154(b) by 93 days.

(21) Appl. No.: 14/778,279

(22) PCT Filed: Feb. 20, 2014

(86) PCT No.: PCT/CN2014/072340
§ 371 (c)(1),
(2) Date: Sep. 18, 2015

(87) PCT Pub. No.: WO2014/146527
PCT Pub. Date: Sep. 25, 2014

(65) Prior Publication Data
US 2016/0188432 A1    Jun. 30, 2016

(30) Foreign Application Priority Data
Mar. 20, 2013   (CN) .......................... 2013 1 0090741

(51) Int. Cl.
*G06F 3/00* (2006.01)
*G06F 9/44* (2006.01)
(Continued)

(52) U.S. Cl.
CPC .............. *G06F 11/302* (2013.01); *G06F 9/54* (2013.01); *G06F 11/34* (2013.01); *G06F 21/54* (2013.01)

(58) Field of Classification Search
CPC ...................................................... G06F 11/302
(Continued)

(56) References Cited

U.S. PATENT DOCUMENTS

2012/0084133 A1    4/2012 Ross et al.
2013/0227394 A1*   8/2013 Sazhin .............. G06F 17/30899
                                                     715/234

OTHER PUBLICATIONS

Suhui Cui, English abstract only of Chinese application No. CN101587522A, Method and system for identifying script virus, publication date Nov. 25, 2009, one page.

(Continued)

*Primary Examiner* — Timothy A Mudrick
(74) *Attorney, Agent, or Firm* — Polsinelli PC

(57) ABSTRACT

The present invention discloses a method and apparatus for intercepting implanted information in an application. The method comprises: determining an Application Programming interface API invoked by an implanted information code as a key API in accordance with information collected in advance, wherein the key API is the API provided by an implanted information provider; after starting a target application, monitoring an act of the target application invoking the key API by hooking the key API; and if the target application initiates a request to invoke the key API, determining that the implanted information code is contained in the target application and intercepting the request to invoke the key API so as to stop the implanted information code from running and to realize the interception of the implanted information in the target application.

9 Claims, 2 Drawing Sheets

(51) Int. Cl.
  *G06F 9/46*    (2006.01)
  *G06F 13/00*   (2006.01)
  *G06F 11/30*   (2006.01)
  *G06F 21/54*   (2013.01)
  *G06F 9/54*    (2006.01)
  *G06F 11/34*   (2006.01)

(58) Field of Classification Search
  USPC .......................................................... 719/328
  See application file for complete search history.

(56) References Cited

OTHER PUBLICATIONS

Shijie Zhou et al., English abstract only of Chinese application No. CN102314561A, Automatic analysis method and system of malicious codes based on API (application program interface) HOOK, publication date Jan. 11, 2012, one page.

International Search Report regarding PCT/CN2014/072340, dated May 28, 2014, 2 pages.

* cited by examiner

METHOD AND APPARATUS FOR INTERCEPTING IMPLANTED INFORMATION IN APPLICATION

FIELD OF THE INVENTION

The present invention relates to the technical field of computer technologies, and in particular, to a method and apparatus for intercepting implanted information in an application.

BACKGROUND OF THE INVENTION

As the mobile internet gets more and more prevailing nowadays, mobile internet users and developers increase rapidly, which causes some operators to launch services such as mobile advertisements. For some purposes, such as obtaining benefits from applications, developers will implant some information in their own applications, for example, implant some advertisements. Currently, before playing, implanted information in substantially all applications need to download data from a server of the implanted information, and sometimes even need to download data such as video. This causes substantial increase of traffic of the application users and large occupation of the user's bandwidth To avoid excessive occupation of the user's bandwidth, some relative technologies capable of effectively intercepting the implanted information in the application appear. In such technologies, in consideration that the information implanted in the application generally obtain a preset identity ID, an IP address and port number of the implanted information server after the application is started, then request the implanted information server according to the ID, and after the implanted information server successfully performs identity verification and returns corresponding implanted information data, the application displays them to the user in an interface. Therefore, by filtering the IP address and port number of the implanted information server, the process of the network request is blocked, thus the purpose of intercepting the implanted information is achieved.

However, if the implanted information server uses a dynamic IP or random port number, the above scheme cannot successfully interrupt advertisements. In addition, during implementation, network connections of the implanted information need to be filtered from all network connections, which will substantially lower the execution efficiency of other applications in the system and causes problems such as unsmooth running.

SUMMARY OF THE INVENTION

To solve the above problem, the present invention is proposed to provide a method and apparatus for intercepting implanted information in an application, which can overcome the above problem or at least partially solve the above problem, and effectively realize the interception of implanted information in the application, meanwhile do not interfere the running of the operating system and improve the interception accuracy.

According to an aspect of the present invention, there is provided a method for intercepting implanted information in an application, comprising:

determining an Application Programming Interface API invoked by an implanted information code as a key API in accordance with information collected in advance, wherein the key API is an API provided by an implanted information provider;

after the target application starts, monitoring an act of the target application invoking the key API by hooking the key API;

if the target application initiates a request to invoke the key API, determining that the implanted information code is contained in the target application and intercepting the request to invoke the key API so as to stop the implanted information code from running and to realize the interception of the implanted information in the target application.

According to another aspect of the present invention, there is provided an apparatus for intercepting implanted information in an application, comprising:

a key API determining unit configured to determine an Application Programming Interface API invoked by an implanted information code as a key API in accordance with information collected in advance, wherein the key API is an API provided by an implanted information provider;

a key API monitoring unit configured to, after the target application starts, monitor an act of the target application invoking the key API by hooking the key API;

a request intercepting unit configured to, if the target application initiates a request to invoke the key API, determine that the implanted information code is contained in the target application and intercept the request to invoke the key API so as to stop the implanted information code from running and to realize the interception of the implanted information in the target application.

According to the method and apparatus for intercepting implanted information in an application according to the present invention, characteristics of invoking the APIs often used in the implanted information code can be collected in advance, thus a key API list can be generated. After the target application starts, these key APIs can be hooked to implement the monitoring of the act of the target application invoking the key API. When it is monitored that the target application initiates a request to invoke a certain key API, the request can be intercepted to stop the running of the implanted information code, thus the interception of the implanted information in the target application is achieved, the occupation of the transmission bandwidth is avoided, and occupation of the user's display interface is further avoided. Meanwhile, in the embodiment of the present invention, only the APIs commonly-used in the implanted information code are hooked, such APIs are generally APIs provided by the implanted information providers, not APIs of the system, so the running of the operating system will not be interfered and the accuracy of the interception is improved.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference numbers denote the same part. In the figures.

DETAILED DESCRIPTION OF THE INVENTION

Figure 1:
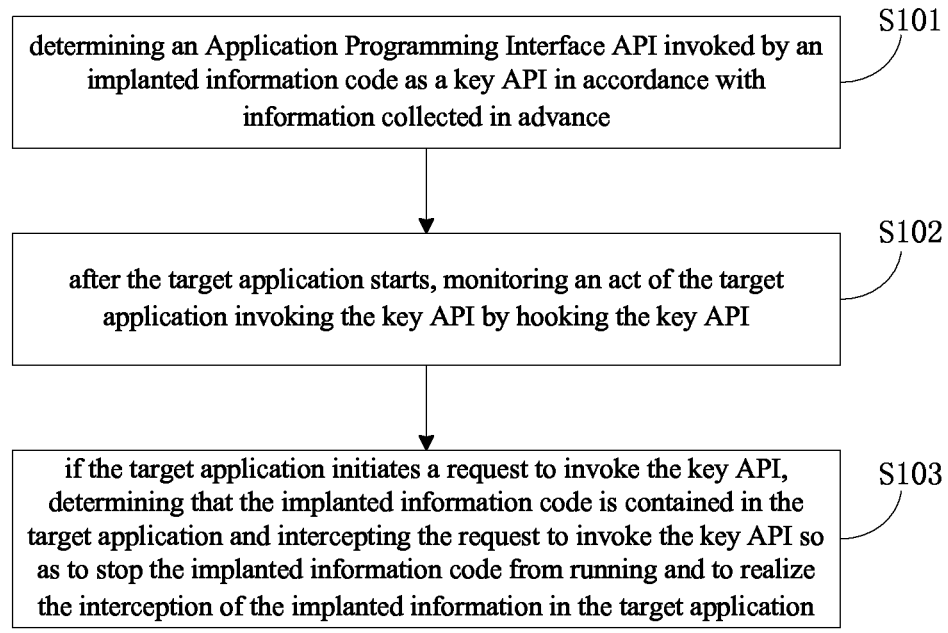
FIG. 1 illustrates a flow chart of a method according to an embodiment of the present invention.

Exemplary embodiments of the present disclosure will be described in more detail with reference to figures. Although the figures show exemplary embodiments of the present disclosure, it should be appreciated that the present disclosure may be implemented in various forms and should not be limited by embodiments described here. On the contrary, these embodiments are provided to make the present disclosure more transparent and complete and convey the scope of the present disclosure completely to those skilled in the art.

First, it should be noted that implanted information in an application generally has the following characteristics (for the purpose of facilitating the description, the advertisement is taken as an example for illustration): an advertisement implanted in the application needs to rely on an Application Programming Interface API of a third-party advertiser. In practical application, it is generally developed in the form of a Software Development Kit SDK, and provided to the application developer to integrate it in its own application so as to complete the implanting of the advertisement. For example, assume that a certain application developer desires to implant an advertisement in the application developed by itself to demonstrate the advertisement to the user when the user using the application to bring income to the developer, the developer can choose to download the advertisement SDK of the advertiser such as admob and implant the advertisement SDK into the application developed by itself. As such, after the application runs, it will invoke the advertiser's API, obtain the advertisement from a server of the advertiser and demonstrate it, so that the application can display the advertiser's advertisement at a proper location.

The so-called advertisement SDK is an advertisement development kit internally installed in the application and provided by an advertisement provider. When a certain application developer needs to implant an advertisement of a certain advertiser, it may implement this in the following manner: first registering a developer's account in a manner such as accessing the advertiser's website, then logging in the advertiser's mobile advertisement platform, completing user's basic information and financial account information, selecting a proper operating system such as Android or iOS, then filling in application-related information according to requirements, and upon completion, obtaining a sole identification code as the developer user's identity ID, meanwhile obtaining a downloading address of the advertisement SDK so as to download the SDK of the advertiser according to the address, then adding the SDK into the project engineering of the application program to achieve the integration of the advertisement SDK into the application. Then, arrangements can be made in the project engineering for a display form (impression type, implanted type or the like) of the advertisement to be displayed, the type (bar-shaped advertising, semi-screen advertising, full-screen advertising or the like) of an advertisement location (a reserved area in the application for displaying the advertisement), an advisement clicking effect (viewing a web page, dialing a telephone number, sending a message, sending a mail, downloading a program or the like, or automatic control by the SDK), advertisement classes (life information, audio and video entertainment, education and training or the like, the SDK may select a corresponding type of advertisement data according a class serial number) and the like, and meanwhile the identity ID allocated by the advertiser to the application developer is filled in a corresponding code. After the application debugging is completed, it may be sent to the advertiser's mobile advertisement platform for approval, and after the approval is passed, the advertisement provided by the advertiser can be displayed in the application in a customized form.

Specifically, when the advertisement implanted in the application is displayed, first the applicant needs to be started, since the advertisement SDK is already integrated in the application, it equals that the application carries an advertisement code. After the application starts, a request to obtain advertisement information can be initiated to the advertisement server by invoking the API of the advertiser, the request carries information such as the ID information of the developer and the size of the desired advertisement. After the advertiser receives the request, it needs to verify the identity of the developer according to the ID information, after verification is passed, a URL (Uniform/Universal Resource Locator) may be returned, and the application may download corresponding advertisement data according to the URL and display them.

As can be seen from the above, during the process of the application displaying the advertisement, the advertisement code in the application needs to invoke the API provided by the advertiser to request for the advertiser's advertisement data, and then perform the relevant display operation. During the process of implementing of the present invention, the Inventor finds that the API provided by the advertiser generally exhibits some characteristics such as a specific function name, and these characteristics are not possessed by APIs of other non-advertisers, whereby these APIs can be used to judge whether the application carries the advertisement code. Hence, in an embodiment of the present invention, characteristics of the advertisement code invoking the API can be collected in advance, and names of these key APIs are stored as files or databases in a certain format. As such, the act of the target application invoking the API can be monitored. Once the target application is found invoking a certain API, it can be judged whether the currently invoked API is the API invoked by the advertisement code collected in advance. If it is, an interception can be performed to stop the execution of the advertisement code so that the application cannot obtain relevant advertisement data, the advertisement cannot be displayed in a display interface thereof, thus the occupation of the transmission bandwidth can be avoided, and an impact on the user can be avoided.

A method for intercepting implanted information in an application according to an embodiment of the present invention is introduced in detail as follows. Referring to FIG. 1, the method can comprise the following steps:

S101: determining an Application Programming Interface API invoked by an implanted information code as a key API in accordance with information collected in advance, wherein the key API is the API provided by an implanted information provider;

As stated above, to judge whether an application contains an advertisement code, characteristics of the advertisement code invoking the API can be collected in advance so that APIs often invoked in various advertisement codes can be collected together. For the purpose of facilitating the description, such APIs invoked by the advertisement codes are called key APIs in embodiments of the present application. After the key APIs are collected, they can be stored, for example, a list may be generated, and information such as names of key APIs and the like is stored in the list. As such, APIs often used in the advertisement codes can be determined by querying the list. Such key APIs are generally APIs provided by advertisement providers (generally called advertisers), and applications integrating the advertisement SDK implement obtainment and display of the advertiser's advertisement by invoking these APIs.

S102: after the target application starts, monitoring an act of the target application invoking the key API by hooking the key API;

Wherein the target application may be any third-party application, or since in practical application, generally, some implanted information such as advertisements can be easily inserted in applications with some specific functions, therefore, the application with a certain specific function may also be regarded as the target application to be monitored, for example, an online video player, a browser or the like. Which applications are started can be known by installing a drive program, and meanwhile, the category and functions of the started application can be judged according to the name of the started application. After a certain target application is found started, the key APIs in the above-mentioned list can be hooked so that the act of the target application invoking the key APIs can be monitored.

S103: if the target application initiates a request to invoke the key API, determining that the implanted information code is contained in the target application and intercepting the request to invoke the key API so as to stop the implanted information code from running and to realize the interception of the implanted information in the target application.

If it is monitored that the target application initiates a request to invoke a certain above-mentioned key API, since the key API is an API often invoked by the advertisement code, it can be determined that the current application contains the advertisement code. If the execution of the request is permitted, the request will be sent to the advertisement server, and then the advertisement server will return corresponding advertisement data, causing the occupation of the transmission bandwidth, and after the advertisement information is displayed, occupation of the display interface of the application will also be caused. Therefore, in an embodiment of the present invention, after it is monitored that the target application initiates a request to invoke a key API, it can be determined that the current application contains the advertisement code, and therefore, the request can be intercepted to stop the advertisement code in the application from running, i.e., realize the interception of the advertisement in the application.

Wherein, the so-called intercepting the request initiated by the target application to invoke the key API means that the invoking request is temporarily not sent to the recipient originally set by the application, then the access point of the key API function can be directly changed to allow it to point to a certain self-defined function and the like so as to change its return value. For example, in a self-defined function, certain erroneous information can be directly retuned. In this way, the request sent by the target application to the advertisement server cannot be successfully delivered, and the transmission of advertisement data will not be caused, thereby saving the occupation of the transmission bandwidth and thereby avoiding the occupation of the display interface by the content of advertisement. Additionally, in practical application, after the request initiated by the target application to invoke the key API is intercepted, prompt information can be provided to the user first to prompt the user that the target application contains the advertisement code, i.e., the advertisement content is about to be displayed in its display interface, the user is queried whether to intercept the advisement, and meanwhile an operating access for selecting interception or no-interception is provided to the user, if a user's answer of intercepting is received, erroneous information can be returned to the application in the above-mentioned manner; if a user's answer of not intercepting is received, the currently-intercepted request to invoke the key API can be allowed to pass so that it is sent to the advertisement server, and the advertisement server returns corresponding advertisement data after performing a identity verification, etc.

In addition, a uniform "setting" access cab be provided to users so that a user can complete uniform interception rules in the "setting", for example, it may be set that interception will be done as long as a certain target application is found invoking a certain key API. As such, after the certain target application is found invoking the certain key API, advertisements in the target application will be directly intercepted according to the user's such setting. In this way, the user does not need to manually select the interception operation or permission operation every time. Noticeably, the uniform setting access here can be a uniform setting access respectively provided for different target applications, for example, firstly, it can be judged which applications are installed in the current system, if there are some target applications that might contain advertisements, the uniform setting access is provided for each target application. As such, if the user needs to intercept all advertisements in a certain target application A, the target application A can be set in the uniform setting access of the target application A in a way that interception will be done as long as the target application is found invoking the key API. If the user does not need to intercept advertisements in a certain target application B, the target application B can be set in the uniform setting access of the target application B in a way that interception is not needed even though the target application is found invoking the key API. If the user needs to intercept a part of the advertisements in a certain target application C, the target application C can be set in the uniform setting access of the target application C in a way that after the target application is found invoking the key API, prompt information will pop up to query the user, etc. Additionally, a uniform setting access can be provided for all target applications so that if the user needs to intercept or permit advertisements in all target applications installed by him, he may uniformly set in the uniform setting access.

Noticeably, after the request to invoke a certain key API sent by a certain target application is intercepted, if the running of the advertisement code needs to be stopped, the stopping may be implemented in many manners. In addition to the above-mentioned manner of pointing the access of the key API to a certain self-defined function to return erroneous information, there may be the manner of directly discarding the request, i.e., cancelling the sending of the request.

In summary, in the embodiments of the present invention, characteristics of invoking the APIs often used in the implanted information code may be collected in advance, thus a key API list can be generated. After the target application starts, these key APIs can be hooked to implement the monitoring of the act of the target application invoking the key API. When it is monitored that the target application initiates a request to invoke a certain key API, the request can be intercepted to stop the running of the implanted information code, thus the interception of the implanted information in the target application is achieved, the occupation of the transmission bandwidth is avoided, and the occupation of the user's display interface is further avoided. Meanwhile, in embodiments of the present invention, only the APIs commonly-used in the implanted information code are hooked, such APIs are generally APIs provided by the implanted information provider, not APIs of the system, so the running of the operating system will not be interfered and the accuracy of interception is improved.

Figure 2:
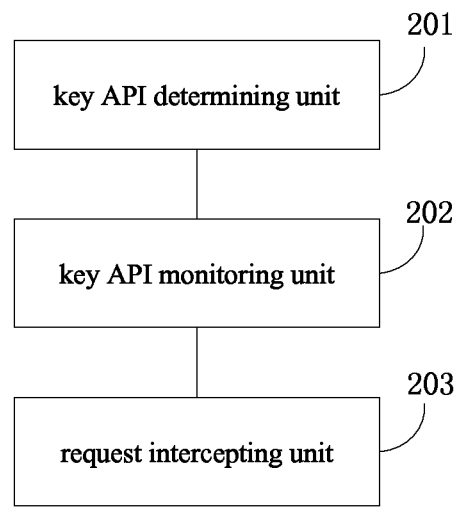
FIG. 2 illustrates a schematic diagram of an apparatus according to an embodiment of the present invention.

Corresponding to the method for intercepting implanted information in an application according to an embodiment of the present invention, an embodiment of the present invention further provide an apparatus for intercepting implanted information in an application, which can comprises the following units as shown in FIG. 2:

a key API determining unit 201 configured to determine an Application Programming Interface API invoked by an implanted information code as a key API in accordance with information collected in advance, wherein the key API is an API provided by an implanted information provider;

a key API monitoring unit 202 configured to, after the target application starts, monitor an act of the target application invoking the key API by hooking the key API;

a request intercepting unit 203 configured to, if the target application initiates a request to invoke the key API, determine that the implanted information code is contained in the target application and intercept the request to invoke the key API so as to stop the implanted information code from running and to realize the interception of the implanted information in the target application.

When specifically implementing, the apparatus can further comprise:

a prompting unit configured to, after the request to invoke the API is intercepted, display prompt information that the target application contains the implanted information code, and query a user whether needs to intercept the implanted information in the target application;

an executing unit configured to stop the implanted information code from running if interception is needed, otherwise, to permit the request to invoke the API.

Alternatively, to avoid the operation of manually selecting the interception or permission every time of the user, the apparatus may further comprise:

a setting access providing unit configured to provide the user with an operating access for uniformly setting an interception rule for a target application, and record the interception rule set by the user for the target application;

a query unit configured to, after intercepting the request to invoke the API, query for the interception rules set by the user, and stop the implanted information code from running if the user sets that implanted information in the target application needs to be intercepted, to achieve the interception of the implanted information in the target application.

Wherein the setting access providing unit can comprise:

a respective setting sub-unit configured to respectively provide an operating access for uniformly setting interception rules for each target application in the system;

or a global setting sub-unit configured to provide all target applications in the system with a global operating access for uniformly setting an interception rule.

When specifically implementing, stopping of the run of the implanted information code is implemented through the following unit:

a sending cancelling unit configured to cancel the sending of the request to invoke the API.

or, in another implementation mode, stopping of the run of the implanted information code can be implemented through the following unit:

an erroneous invoking information returning unit configured to point the request to invoke the API to a self-defined address so as to return erroneous invoking information with respect to the request to invoke the API.

In summary, in the embodiments of the present invention, characteristics of invoking the APIs often used in the implanted information code may be collected in advance, thus a key API list can be generated. After the target application starts, these key APIs can be hooked to implement the monitoring of the act of the target application invoking the key API. When it is monitored that the target application initiates a request to invoke a certain key API, the request can be intercepted to stop the running of the implanted information code, thus the interception of the implanted information in the target application is achieved, the occupation of transmission bandwidth is avoided, and the occupation of the user's display interface is further avoid. Meanwhile, in the embodiments of the present invention, only APIs commonly-used in the implanted information code are hooked, such APIs are generally APIs provided by the implanted information provider, not APIs of the system, so the running of the operating system will not be interfered and the accuracy of interception is improved.

The algorithm and display provided herein are not intrinsically related to any specific computer, virtual system or other devices. Various general systems may also be used together with a teaching based on this. According to the above depictions, structures required for constructing such type of systems are obvious. Besides, the present application is not with respect to any specific programming language. It shall be understood that various programming languages may be used to implement the content of the present application described here, and the above depictions for a specific language are intended to reveal preferred embodiments of the present application.

The description as provided here describes a lot of specific details. However, it is appreciated that embodiments of the present invention may be implemented in the absence of these specific details. Some embodiments do not specify in detail known methods, structures and technologies to make the description apparent.

Similarly, it should be appreciated that in order to simplify the present disclosure and help understand one or more aspects of the present invention, in the above depictions of exemplary embodiments of the present application, features of the present application are sometimes grouped together to an individual embodiment, figure or depiction thereof. However, the disclosed method should not be interpreted as the following intention: the present application claims more features than the features explicitly recited in each claim. More exactly, as reflected by the following claim set, aspects of the invention are less than all features of an individual embodiment disclosed previously. Therefore, the claim set conforming to a specific implementation mode is thereby explicitly incorporated into this specific implementation mode, wherein each claim itself serves as an individual embodiment of the present application.

Those skilled in the art may appreciate that modules in the apparatus in the embodiment may be changed adaptively and they are set in one or more apparatuses different from the present embodiment. Modules or units or assemblies in the embodiment may be combined into one module or unit or assembly, and besides, they may be divided into a plurality of submodules, subunits or subassemblies. Except that at least some of such features and/or processes or units are mutually repellent, all features disclosed in the specification (including the accompanying claims, abstract and figures) and all processes or units of any method or apparatus disclosed in this way may be combined by employing any combination. Unless otherwise stated expressly, each feature disclosed in the specification (including the accompanying claims, abstract and figures) may be replaced with an alternative feature providing identical, equivalent or similar objective.

In addition, those skilled in the art can understand that even though some embodiments described here include some features other than other features included in other embodiments, combination of features of different embodiments means being within the scope of the present application and forming different embodiments. For example, in the appended claim set, any one of the claimed embodiments may be used in an arbitrary combination manner.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the apparatus according to embodiments of the present invention. The present invention may also be implemented as an apparatus or device program (e.g., computer program and computer program product) for executing part or all of the method described here. Such programs implementing the present invention may be stored in a computer-readable medium, or may be in a form having one or more signals. Such signals can be obtained by downloading from the Internet, or provided on a carrier signal or provided in any other forms.

Figure 3:
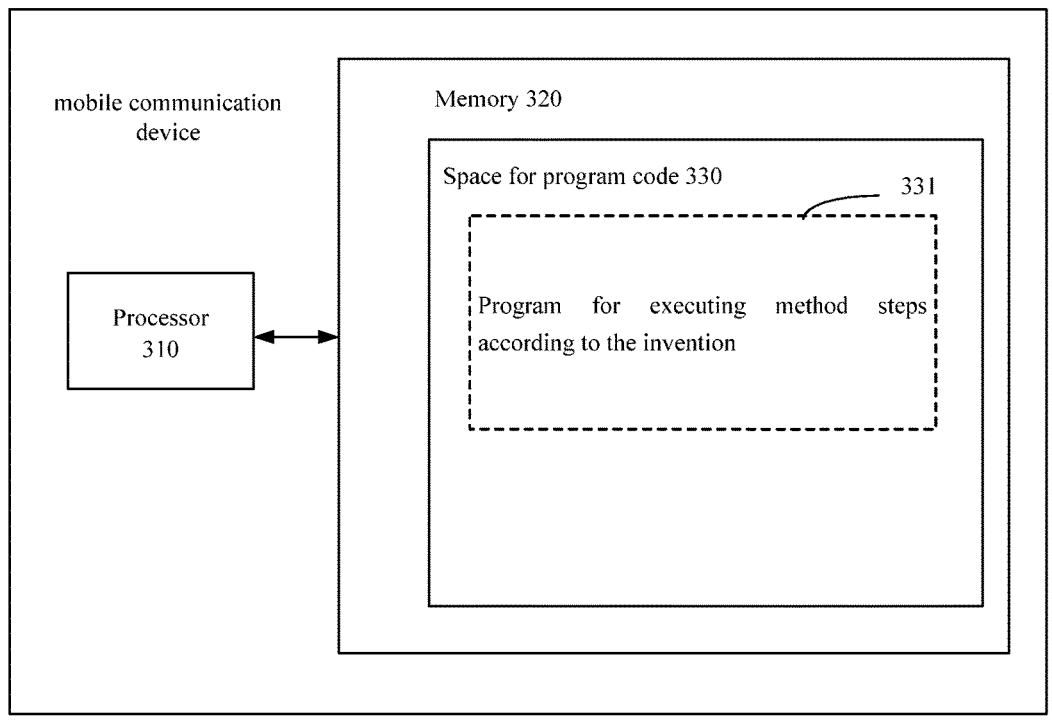
FIG. 3 illustrates a block diagram of a mobile communication device for executing a method of the present invention.
Figure 4:
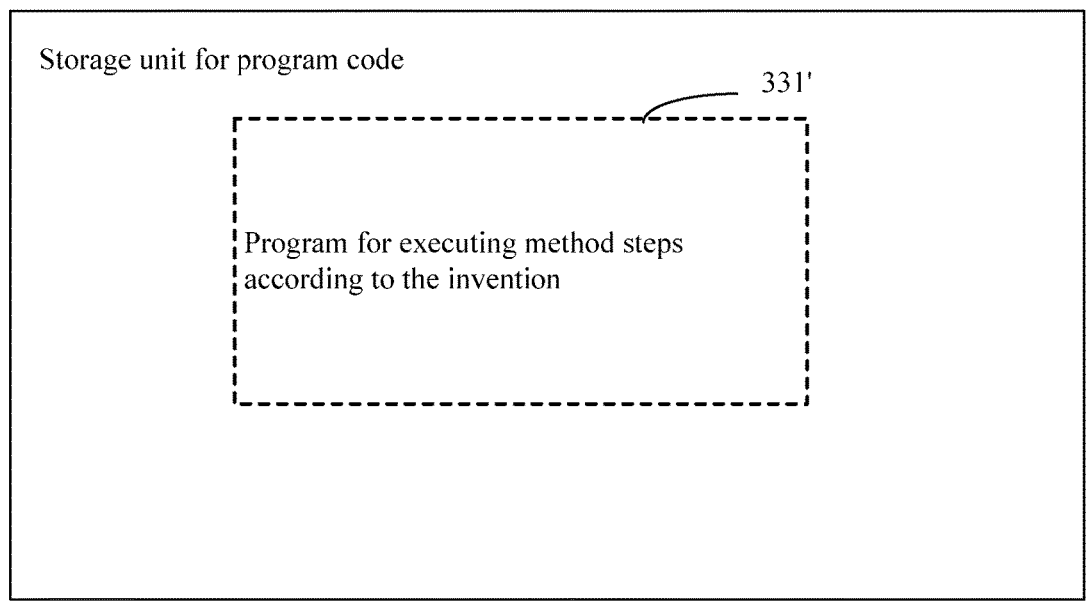
FIG. 4 illustrates a memory unit for maintaining or carrying a program code for implementing the method according to the present invention.

For example, FIG. 3 illustrates a mobile communication device for implementing the method for intercepting implanted information in an application according to the present invention. The mobile communication device conventionally comprises a processor 310 and a computer program product or computer-readable medium in the form of a memory 320. The memory 320 may be a flash memory, EEPROM (Electrically Erasable Programmable Read-Only Memory), EPROM, hard disk or ROM-like electronic memory. The memory 320 has a storage space 330 for a program code 331 for executing any step of the above method. For example, the storage space 330 for the program code may comprise program codes 331 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 4. The memory unit may have a storage section, a storage space or the like arranged in a similar way to the memory 320 in the mobile communication device of FIG. 3. The program code may for example be compressed in a suitable form. Usually, the memory unit includes a computer-readable code 331', namely, a code readable by a processor such as 310. When these codes are run by the server, the server is caused to execute steps of the method described above.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

The present application may be applied to a computer system/server, which may operate together with many other universal or dedicated computing system environment or configuration. Well-known computing systems, examples of environments and/or configurations adapted for use with the computer system/server include but not limited to: personal computer, server computer system, thin client, thick client, held-held or laptop device, microprocessor-based system, set-top box, programmable consumer electronics, network personal computer, small-sized computer system, large computer system, and a distributed cloud computing technology environment including any of the above systems.

The computer system/server may be described in general context of a computer system-executable instruction (such as program module) executed by the computer system. Usually, the computer modules may include routines, programs, target programs, assemblies, logic, data structures and the like, and they execute specific tasks or implement specific abstract data types. The computer system/server may be implemented in the distributed cloud computing environment in which tasks are executed by a remote processing device linked through a communication network. In the distributed cloud computing environment, the program module may be located in a local memory of a storage device or on a storage medium of a remote computing system.

The invention claimed is:

1. A method for intercepting implanted information in an application, comprising:
   determining, by a processor, an Application Programming Interface (API) invoked by an implanted information code as a key API in accordance with information collected in advance, wherein the key API is an API provided by an implanted information provider;
   after a target application starts, monitoring, by the processor, an act of the target application invoking the key API by hooking the key API; and
   if the target application initiates a request to invoke the key API, determining, by the processor, that the implanted information code is contained in the target application and intercepting the request to invoke the key API to stop the implanted information code from running and to realize the interception of the implanted information in the target application, wherein stopping the implanted information code from running comprises:
cancelling the request to invoke the API; or
pointing the request to invoke the API to a self-defined address to return erroneous invoking information with respect to the request to invoke the API.

2. The method according to claim 1, after intercepting the request to invoke the API, the method further comprises:
displaying prompt information that the target application contains the implanted information code, and querying whether a user needs to intercept the implanted information in the target application; and
stopping the implanted information code from running if an interception is needed, otherwise, permitting the request to invoke the API.

3. The method according to claim 1, further comprising:
providing the user with an operating access for uniformly setting an interception rule for the target application, and recording the interception rule set by the user for the target application;
after intercepting the request to invoke the API, the method further comprises:
querying for the interception rule set by the user, and stopping the implanted information code from running if the user sets that implanted information in the target application needs to be intercepted, to achieve the interception of the implanted information in the target application.

4. The method according to claim 3, wherein providing the user with an operating access for uniformly setting interception rules for the target application comprises:
respectively providing an operating access for uniformly setting an interception rule for each target application in the system; or
providing all target applications in the system with a global operating access for uniformly setting the interception rule.

5. An apparatus for intercepting implanted information in an application, comprising:
a memory having instructions stored thereon;
a processor to execute the instructions to perform operations for intercepting implanted information in an application, the operations comprising:
determining an Application Programming Interface (API) invoked by an implanted information code as a key API in accordance with information collected in advance, wherein the key API is an API provided by an implanted information provider;
after the target application starts, monitoring an act of the target application invoking the key API by hooking the key API; and
if the target application initiates a request to invoke the key API, determining that the implanted information code is contained in the target application and intercepting the request to invoke the key API to stop the implanted information code from running and to realize the interception of the implanted information in the target application,
wherein stopping the implanted information code from running comprises:
cancelling the request to invoke the API; or
pointing the request to invoke the API to a self-defined address to return erroneous invoking information with respect to the request to invoke the API.

6. The apparatus according to claim 5, the operations for intercepting implanted information in an application further comprising:
after the request to invoke the API is intercepted, displaying prompt information that the target application contains the implanted information code, and querying whether a user needs to intercept the implanted information in the target application; and
stopping the implanted information code from running if an interception is needed, otherwise, permitting the request to invoke the API.

7. The apparatus according to claim 5, the operations for intercepting implanted information in an application further comprising:
providing the user with an operating access for uniformly setting an interception rule for the target application, and recording the interception rule set by the user for the target application; and
after intercepting the request to invoke the API, querying for the interception rule set by the user, and stopping the implanted information code from running if the user sets that implanted information in the target application needs to be intercepted, to achieve the interception of the implanted information in the target application.

8. The apparatus according to claim 7, wherein the providing the user with an operating access for uniformly setting interception rules for the target application comprises:
respectively providing an operating access for uniformly setting interception rules for each target application in the system; or
providing all target applications in the system with a global operating access for uniformly setting the interception rule.

9. A non-transitory computer readable medium having instructions stored thereon that, when executed by at least one processor, cause the at least one processor to perform operations for intercepting implanted information in an application, the operations comprising:
determining an Application Programming Interface (API) invoked by an implanted information code as a key API in accordance with information collected in advance, wherein the key API is an API provided by an implanted information provider;
after a target application starts, monitoring an act of the target application invoking the key API by hooking the key API; and
if the target application initiates a request to invoke the key API, determining that the implanted information code is contained in the target application and intercepting the request to invoke the key API to stop the implanted information code from running and to realize the interception of the implanted information in the target application,
wherein stopping the implanted information code from running comprises:
cancelling the request to invoke the API; or
pointing the request to invoke the API to a self-defined address to return erroneous invoking information with respect to the request to invoke the API.

* * * * *